US005716530A

United States Patent [19]

Strominger et al.

[11] Patent Number: 5,716,530
[45] Date of Patent: Feb. 10, 1998

[54] BIOPOLYMER USE AS A SAND FILTER AID

[75] Inventors: Michael G. Strominger, Dekalb, Ill.; Keith D. Gibbs, Yorba Linda, Calif.

[73] Assignee: Nalco Chemical Company, Naperville, Ill.

[21] Appl. No.: 766,252

[22] Filed: Dec. 13, 1996

Related U.S. Application Data

[63] Continuation-in-part of Ser. No. 417,325, Apr. 5, 1995, abandoned.

[51] Int. Cl.[6] ............................................. B01D 21/01
[52] U.S. Cl. ........................... 210/727; 209/5; 210/730; 210/731; 210/734; 210/778; 423/122
[58] Field of Search ..................... 209/5; 210/725, 210/727, 728, 730, 777, 778, 807, 731, 734; 423/121, 122, 130

[56] References Cited

U.S. PATENT DOCUMENTS

| | | | |
|---|---|---|---|
| 3,085,853 | 4/1963 | Lesinski et al. | 210/730 |
| 3,975,496 | 8/1976 | Smalley et al. | 423/122 |
| 5,008,089 | 4/1991 | Moody et al. | 210/730 |
| 5,041,269 | 8/1991 | Moody et al. | 210/730 |
| 5,091,159 | 2/1992 | Connelly et al. | 423/122 |
| 5,217,620 | 6/1993 | Mahoney et al. | 210/730 |
| 5,387,405 | 2/1995 | Connelly et al. | 210/730 |

FOREIGN PATENT DOCUMENTS

| | | |
|---|---|---|
| 825234 | 10/1969 | Canada. |
| 1154993 | 6/1989 | United Kingdom. |

*Primary Examiner*—Peter A. Hruskoci
*Attorney, Agent, or Firm*—Robert A. Miller; James J. Drake; Kelly L. Cummings

[57] ABSTRACT

In the Bayer process for producing alumina from bauxite of the type wherein the bauxite is added to a caustic solution to produce a soluble aluminate solution and an insoluble red mud fraction which is then subjected to one or more separation steps to produce a thickener overflow which is then subjected to a Sand Filter to polish the thickener overflow the improvement which comprises treating the thickener overflow with a solids removal efficiency improving amount of a biopolymer.

4 Claims, No Drawings

5,716,530

BIOPOLYMER USE AS A SAND FILTER AID

BACKGROUND OF THE INVENTION

1. Reference to Related Patent

The present application is a continuation-in-part of application Ser. No. 08/417,325, filed Apr. 5, 1995, now abandoned by Michael G. Strominger and Keith D. Gibbs, entitled "Biopolymer Use as a Sand Filter Aid", the disclosure of which is incorporated herein by reference.

2. Field of the Invention

The invention relates to an improved process for filtering Bayer process liquor, more particularly, to a method of improving sand filtration of Bayer liquor.

3. Description of the Prior Art

The Bayer process recovers alumina from bauxite by the reaction of $Al_2O_3$ with caustic (NaOH) liquor, separation of the insoluble material, and precipitation of the alumina from the clarified solution if desired, water of hydration is removed by calcining.

Treatment of bauxite ore is usually confined to crushing, washing, and drying operations. Most of the bauxites that are mined do not require the more costly beneficiation techniques used on some other metal ores. Impurities such as iron, silicon, and titanium containing minerals are frequently so finely dispersed in the bauxite that they cannot be readily separated by physical methods. In some instances, however, bauxite ore may be upgraded by washing or wet screening to remove sand and some of the clay minerals.

At the beneficiation plant, the bauxite ore is slurried with liquor containing high levels of caustic (generally $\geq 200$ g/l—expressed as $Na_2CO_3$). The resulting slurry is pumped to pressurized digesters where high pressure steam is used to raise the temperature. Both alumina and silica are dissolved during this step and a complex sodium aluminum silicate (desilication product) is precipitated.

It is important to note that each Bayer plant is designed to process a specific type of bauxite ore. Because the solubility of alumina monohydrate and alumina trihydrate differ to a large extent in aqueous caustic solutions, different temperatures, and caustic levels are required when different types of bauxite are utilized. As an example, trihydrate bauxite may be digested at temperatures of 140° C. and at alkalinities of ~200 g/liter caustic. With a monohydrate bauxite, which is not as readily soluble, temperatures as high as 250°–300° C. and caustic levels of up to 300 g/liter are required.

The resulting slurry of sodium aluminate solution and insoluble red mud from the digesters is cooled through a series of flash tanks in order to reduce the pressure and bring the temperature of the liquor down to the atmospheric boiling point. The coarser size fraction is generally removed as underflow by using either gravity separators or wet cyclones. The overflow slurry contains the finer size fraction and normally reports to a thickener where a solid-liquid separation step takes place. The suspended solids level in the overflow liquor from these thickeners generally contains 50–300 mg/l of suspended solids. This far exceeds the <10 mg/l level necessary to achieve the required product quality with regard to iron impurity. Therefore, this settler overflow liquor is further clarified by batch filtration, specifically pressure filter presses or hydrostatic head gravity sand filters.

U.S. Pat. No. 5,091,159, the disclosure of which is incorporated herein by reference, focuses on a method of improving the efficiency of Kelly pressure filter presses, the most common brand of pressure filter press used in the filtration of pregnant Bayer liquor. Occasionally filter aid is also body fed on a continuous basis to the settler overflow.

Batch pressure filter presses consist of parallel perforated plates covered with a filter medium cloth frequently polymeric in nature. An inorganic filter aid consisting of tricalcium aluminate is commonly used as a means of providing adequate filtration rates, reducing filter medium blinding, and improving filtrate clarity. Tricalcium aluminate is used as a filter medium pre-coat, is fed continuously into the liquor stream feeding the press ("body-fed"), or both. Lime is used as an inorganic filter aid in some instances. Lime is generally "body-fed" only.

Although less commonly used, batch hydrostatic head, gravity sand filters are used in some refineries. Sand filters consist of a bed of sand into which the settler overflow liquor is injected. The sand bed is the filter medium. A fraction of the suspended solids in the settler overflow is trapped in the void spaces of the sand bed. The clearer filtrate liquor exits by gravity. The ratio of suspended solids in the filtrate to that of the filter feed defines the solids removal efficiency.

To maintain the necessarily high solids removal efficiency in a sand filter, it is critical that the majority of the sand particles in the bed remain relatively compacted and undisturbed during the filtration cycle. The feed liquor is introduced into the sand bed through sparges. These sparges are rotated slowly and are very gradually raised and lowered in the sand bed. Over time the sand bed will load with suspended solids to a point where the sand must be cleaned, or backwashed. Some new sand is added after backwashing to replenish sand lost through attrition. Great care is taken to not fluidize the sand bed except during this backwash cycle.

In stark contrast to the pressure filter press, sand filters used in the Bayer process use no inorganic filter aid. As understood in the art, Kelly filtration refers to a process where a filtering pressure is imposed by a liquid pump or by compressed gas whereas in the case of sand filtration no external pressure other than the pressure resulting from the hydrostatic head is applied and no filter aid other than the sand itself is used. Further, an inorganic filter aid such as tricalcium aluminate or lime, and not sand, would be used to improve filtration in Kelly filtration. In Kelly filtration, the filter cake itself is largely responsible for capturing and retaining the suspended solids. By contrast, no filter cake is formed in sand bed filtration, and the suspended solids are captured within the void spaces of the sand bed. Thus, Kelly and sand bed filtrations involve entirely different mechanisms for removing suspended solids from the feed slurry.

U.S. Pat. No. 5,387,405, issued to Connelly et al. describes 'Bayer liquor polishing' as a potential alternative to the filtration of settler overflow liquor. Instead of being filtered, the overflow liquor from the primary settlers is itself subjected to a secondary settling unit operation. This technology teaches the use of an inorganic particulate filter aid and a soluble carbohydrate polymer to produce a supernatant alumina-bearing liquor very low in suspended solids. It is proposed that this low suspended solids liquor could be sent to precipitation without being filtered in pressure or sand filters.

The clarified liquor (filtrate) is cooled until it becomes supersaturated with alumina trihydrate. This liquor is seeded with crystals of alumina trihydrate to induce precipitation of alumina trihydrate in a series of tanks over a period of days. In the precipitation process, caustic soda is regenerated. The caustic soda and sodium aluminate remaining in the liquor are then recycled to digestion.

The alumina trihydrate solids from precipitation are subsequently classified by particle size. In the precipitation process, caustic soda is regenerated. The caustic soda and sodium aluminate remaining in the liquor are then recycled to digestion. The coarser fraction of alumina trihydrate is washed and dewatered most commonly on rotary vacuum filters to remove a fraction of the water, soda, and other contaminants. If the alumina is to be used in manufacture of aluminum metal, etc. it is calcined to remove the remaining free water and water of hydration. The finer alumina trihydrate from the classification step may or may not be washed and/or mechanically dried prior to being used as seed in precipitation.

SUMMARY OF THE INVENTION

The invention is an improvement on the Bayer process for producing alumina from bauxite of the type wherein the bauxite is added to a caustic solution to produce a slurry containing soluble sodium aluminate and an insoluble red mud fraction which is then subjected to one or more separation steps to produce a thickener overflow which is then subjected to sand filtration to polish the thickener overflow, the improvement which comprises treating the thickener overflow with a filtration improving amount of a biopolymer. The filtration improvement is improved solids removal efficiency.

DESCRIPTION OF THE PREFERRED EMBODIMENTS

The improvement of the invention may be used in conjunction with a number of conventional flocculants which are normally used to separate soluble sodium aluminate from the insoluble red mud fraction in the settlers of the Bayer process. In the preferred embodiment these flocculants may be selected from the group consisting of poly (sodium acrylate), poly(ammonium acrylate), poly (acrylamide), copolymers of sodium or ammonium acrylate and acrylamide, copolymers of sodium or ammonium acrylate and acrylamide containing pendant hydroxamic acid groups, starch and dextran.

The biopolymer of the invention should be water soluble and will generally have a molecular weight of at least 50,000 although values in the range 500,000 up to 10 million is preferred. The biopolymer preferably is a microbially produced polysaccharide and has a preponderance of glucose units joined together through 1:6 glucoside linkages. Suitable materials are described in U.S. Pat. No. 3,085,853. Dextran derivatives, such as the polyphosphates described in GBA-1154993 or dextran sulphates mentioned in CA-A-825234, can also be used. Further, in alternative embodiments of the invention, polysaccharides including pullulan, zooglan, lactan, alginates, starch and mixtures thereof may be used. The biopolymer can be supplied in the form of dry particulate solid. The biopolymer of the invention is usually dissolved in water or alkaline plant liquor before addition to the thickener overflow in the process of the invention.

The biopolymer of the invention may be used at a variety of dosages. Typically the range will be between 0.05–15 mg/l. At preferred embodiment good results are frequently achieved using from 0.05–5 mg/l. Typical and preferred dosages for the dextran are any amounts ranging from at least 0.1–2 mg/l up to much higher amounts.

When practicing the invention as described above it is possible to achieve a substantial reduction in suspended solids of the filtrate (improved solids removal efficiency). This results in improved product quality which therefore means that a lower level of contaminants are present in the alumina produced by the Bayer process.

The following example is presented to describe preferred embodiments and utilities of the invention and is not meant to limit the invention unless otherwise stated in the claims appended hereto.

EXAMPLE 1

| | | | | |
|---|---|---|---|---|
| A Polysaccharide Dose mg/l | 0 | 2 | 2.5 | 3 |
| B Ave. Filter Feed Rate kL/hr | 170 | 188 | 187 | 180 |
| C Ave. Filter Level % | 25 | 24 | 31 | 25 |
| D Ave. Sparge Level % | 57 | 59 | 61 | 57 |
| E No. of Data Points | 56 | 24 | 23 | 47 |
| F Filter Feed Solids mg/l | 62 | 60 | 59 | 64 |
| G Filtrate mg/l | 15 | 10 | 8 | 6 |
| H Solids Removal Efficiency % 100*(F − G)/F | 76 | 83 | 86 | 92 |

The above plant trial data was obtained by analyzing sand filter feed and filtrate samples which were collected once every two hours. The solids removal efficiency was calculated according to the formula on line H.

Changes can be made in the composition, operation and arrangement of the method of the present invention described herein without departing from the concept and scope of the invention as defined in the following claims:

We claim:

1. An improvement in the Bayer process for producing alumina from bauxite of the type wherein the bauxite is added to a caustic solution to produce a slurry of sodium aluminate solution and an insoluble red mud fraction which is then subjected to a thickener and separation steps to produce a thickener overflow, wherein said thickener overflow results from solid liquid separation, wherein said thickener overflow is then subjected to sand filtration to polish the thickener overflow the improvement comprising adding to the thickener overflow being fed to said sand filtration from 0.05 to 15 mg/l of a water-soluble polysaccharide, wherein no inorganic filter aid is added to said thickener overflow being fed to said sand filtration.

2. The process of claim 1 further comprising the step of adding a flocculant to the slurry to separate the red mud fraction from the aluminate solution wherein the flocculant is selected from the group consisting of poly(sodium acrylate), poly(ammonium acrylate), poly(acrylamide), copolymers of sodium or ammonium acrylate and acrylamide, and copolymers of sodium or ammonium acrylate and acrylamide containing pendant hydroxamic acid groups.

3. The process of claim 1 wherein the water-soluble polysaccharide has a molecular weight of at least 50,000.

4. The process of claim 1, wherein the water-soluble polysaccharide is selected from the group consisting of dextran, pullulan, alginate, zooglan, lactan, starch and mixtures thereof.

* * * * *